Nov. 7, 1967    O. O. ANDERSON    3,351,232
ARTICLE DISPENSER INCLUDING A ROTARY SUPPORT FOR
A PLURALITY OF ARTICLE RETAINING MAGAZINES
Filed Oct. 21, 1965    4 Sheets-Sheet 2
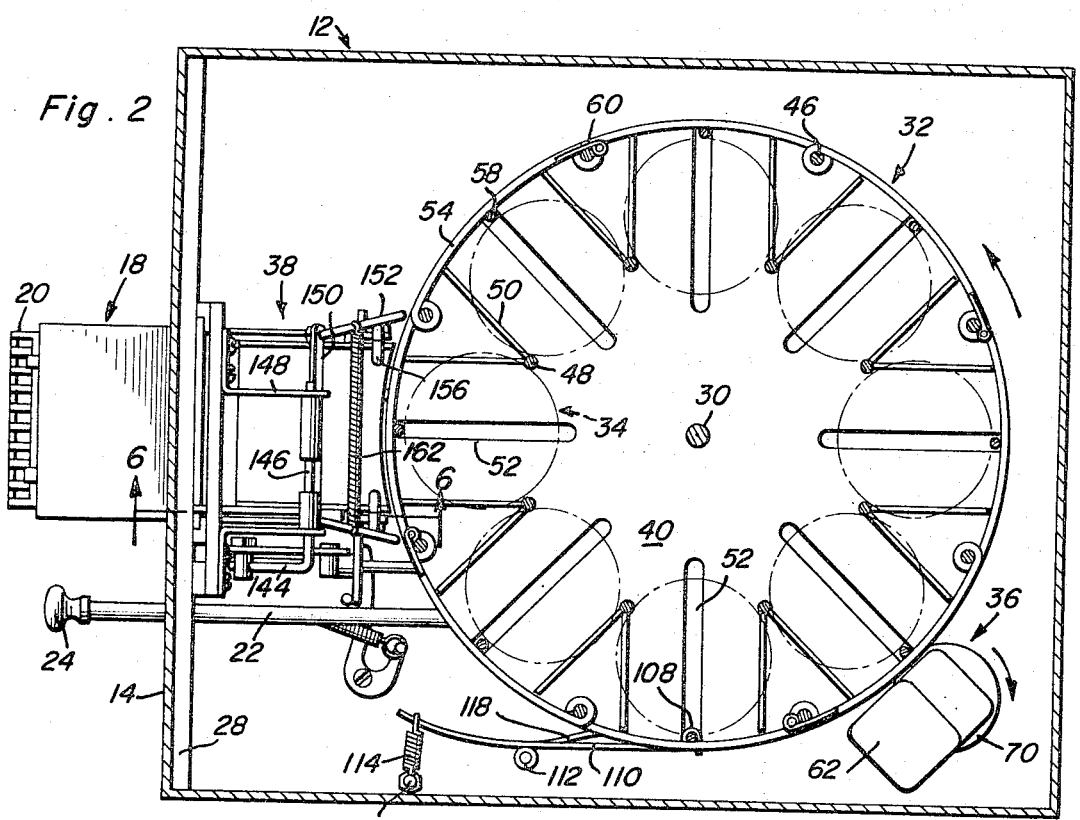
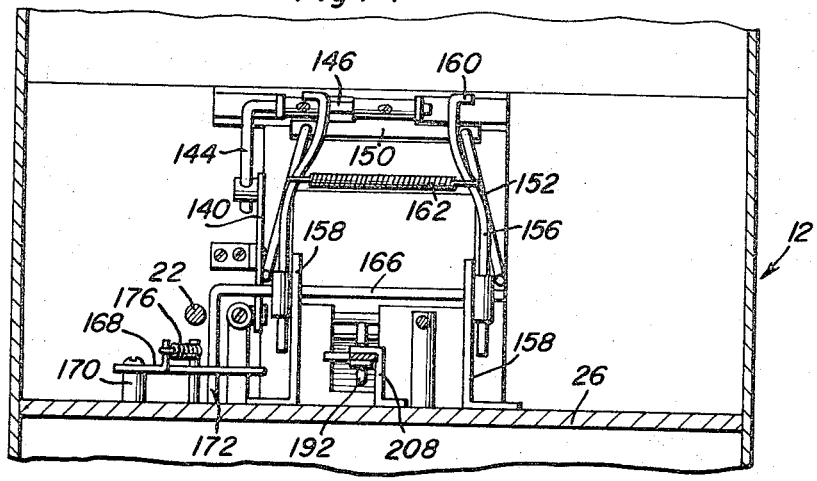
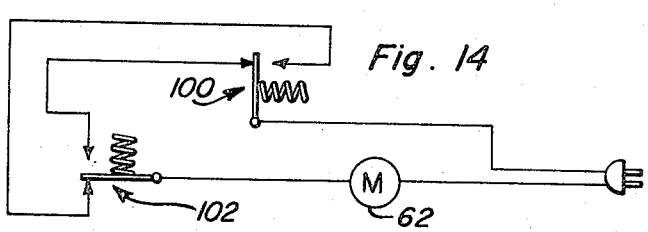
Olof O. Anderson
INVENTOR.
BY *Clarence A. O'Brien*
*and Harvey B. Jacobson*
Attorneys Nov. 7, 1967   O. O. ANDERSON   3,351,232
ARTICLE DISPENSER INCLUDING A ROTARY SUPPORT FOR
A PLURALITY OF ARTICLE RETAINING MAGAZINES
Filed Oct. 21, 1965   4 Sheets-Sheet 3

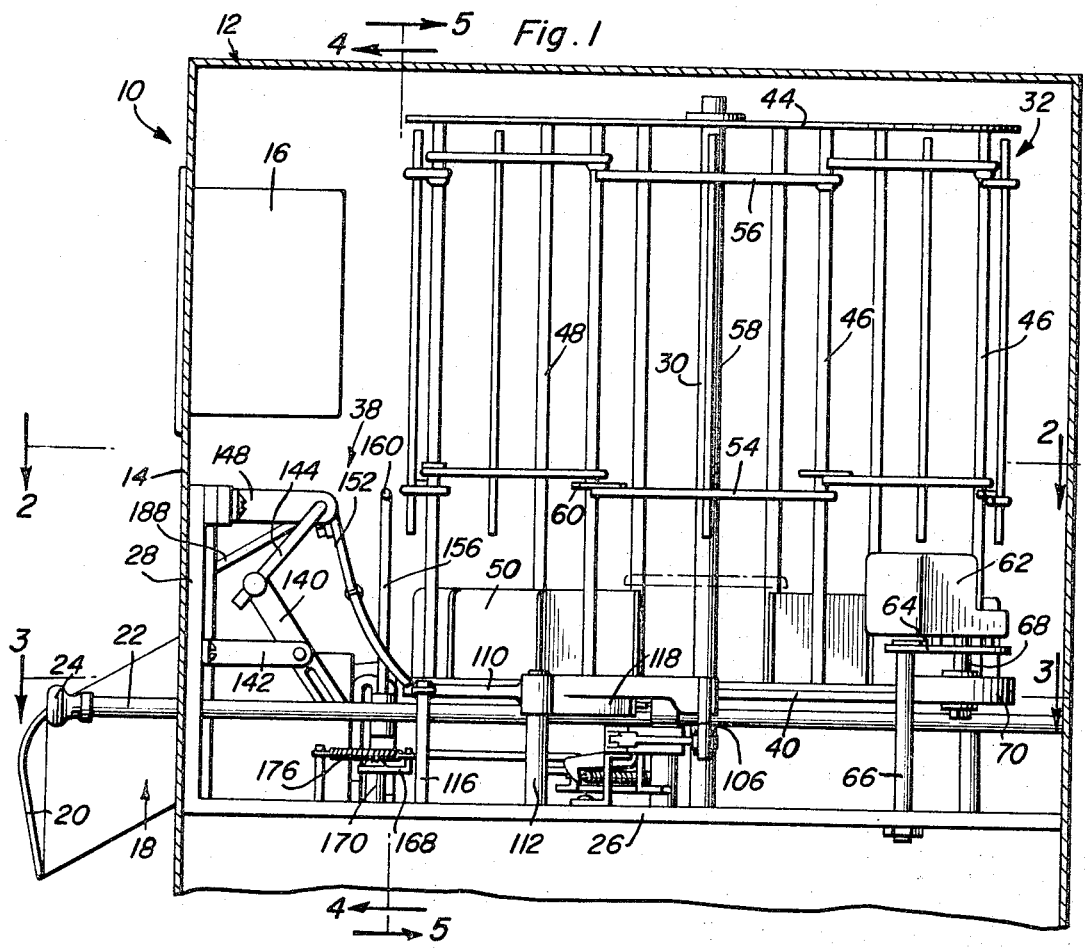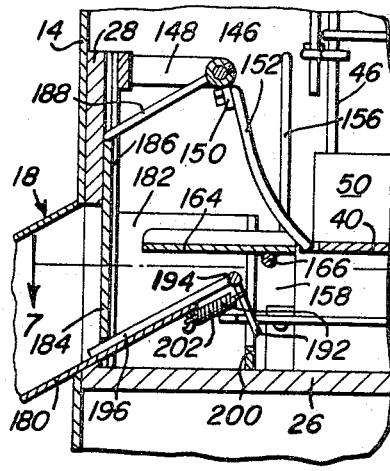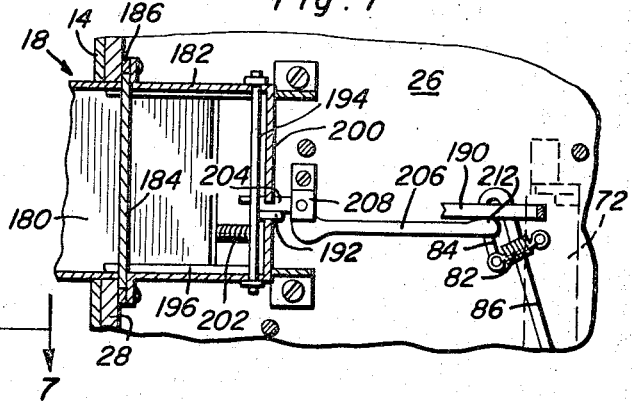
Olof O. Anderson
INVENTOR.

Olof O. Anderson
INVENTOR.

BY *Clarence A. O'Brien*
and *Harvey B. Jacobson*
Attorneys

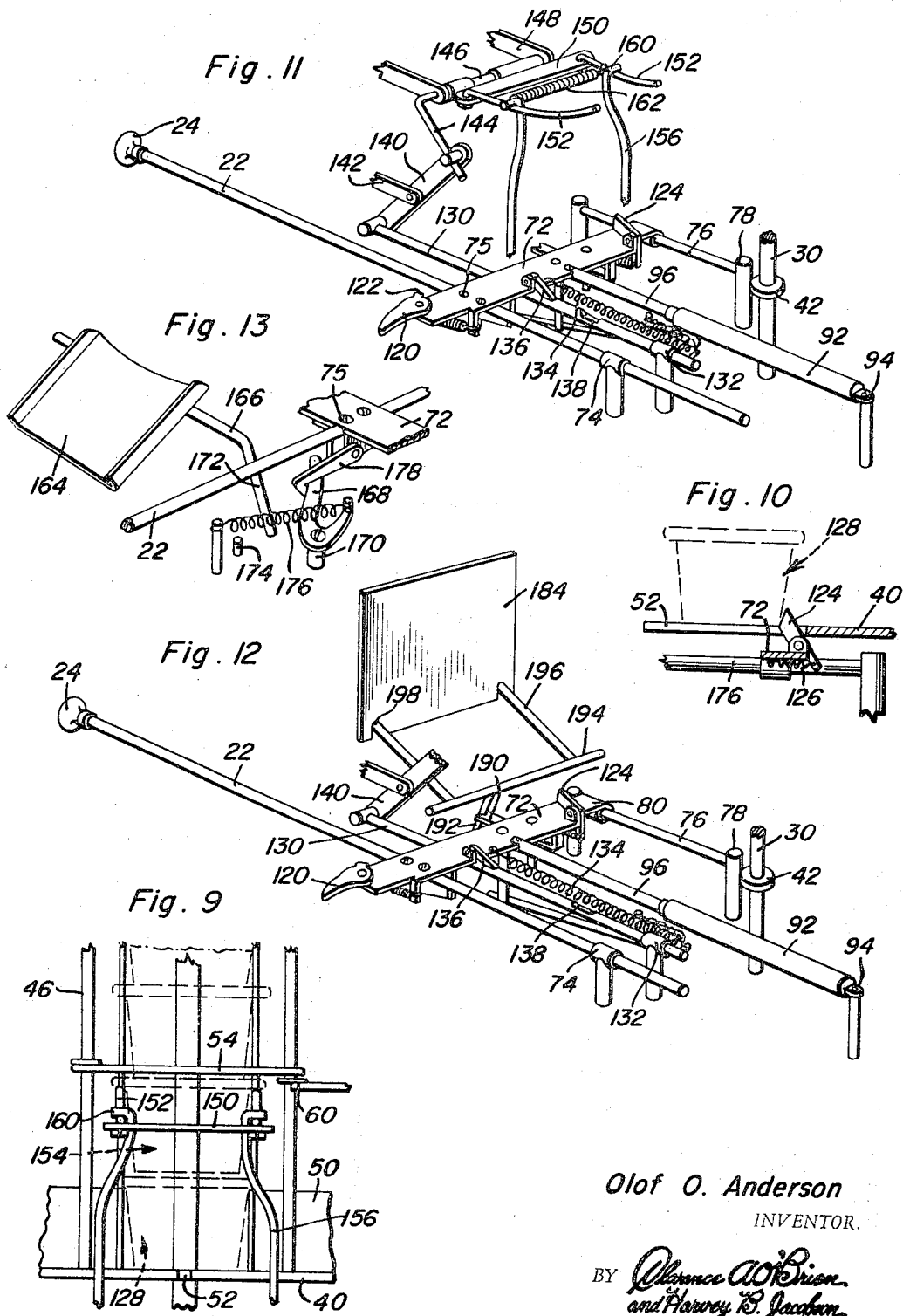

United States Patent Office 3,351,232
Patented Nov. 7, 1967

3,351,232
ARTICLE DISPENSER INCLUDING A ROTARY SUPPORT FOR A PLURALITY OF ARTICLE RETAINING MAGAZINES
Olof O. Anderson, Rte. 1, Box 163, Solsberry, Ind. 47459
Filed Oct. 21, 1965, Ser. No. 499,960
10 Claims. (Cl. 221—113)

This invention relates to vending machines in general and more particularly to an automatic dispenser of articles such as lidded containers containing certain quantities of items to be sold.

A primary object of the present invention, is to provide a vending machine within which a plurality of articles are stored in vertically stacked columns, the lowermost article from one column being ejected while the articles thereabove are temporarily lifted off the article-storing cage on which the articles are supported.

An additional object of the present invention is to provide an article-dispensing machine for vertically stacked columns of articles supported on a rotatable cage adapted to be indexed so as to successively present another column of articles to an ejection mechanism associated with the machine.

A further object of the present invention is to provide a vending machine from which articles are automatically dispensed in response to selective actuation of an ejection mechanism effective to displace the lowermost article in a vertical stack onto a weight-responsive receiving member operative upon release to deposit the article into a delivery chute from which the article is withdrawn.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side sectional view through a vending machine constructed in accordance with the present invention.

FIGURE 2 is a top sectional view taken substantially through a plane indicated by section line 2—2 in FIGURE 1.

FIGURE 4 is a partial side sectional view taken substantially through a plane indicated by section line 4—4 in FIGURE 1.

FIGURE 6 is a partial sectional view taken substantially through a plane indicated by section line 6—6 in FIGURE 2.

FIGURE 7 is a partial sectional view taken substantially through a plane indicated by section line 7—7 in FIGURE 6.

FIGURE 9 is a partial front elevational view of a portion of the stack-lifting mechanism associated with the present invention.

FIGURE 10 is a partial sectional view showing a portion of the ejection mechanism in one operational phase thereof.

FIGURE 11 is a perspective view of certain parts of the vending mechanism in one of the operational phase positions thereof.

FIGURE 12 is a perspective view of some of the same parts shown in FIGURE 11 and other parts not shown therein in the same operational phase position.

FIGURE 13 is a perspective view of some other parts of the vending mechanism.

FIGURE 14 is a simplified electrical circuit diagram associated with the vending machine of the present invention.

Figure 3:
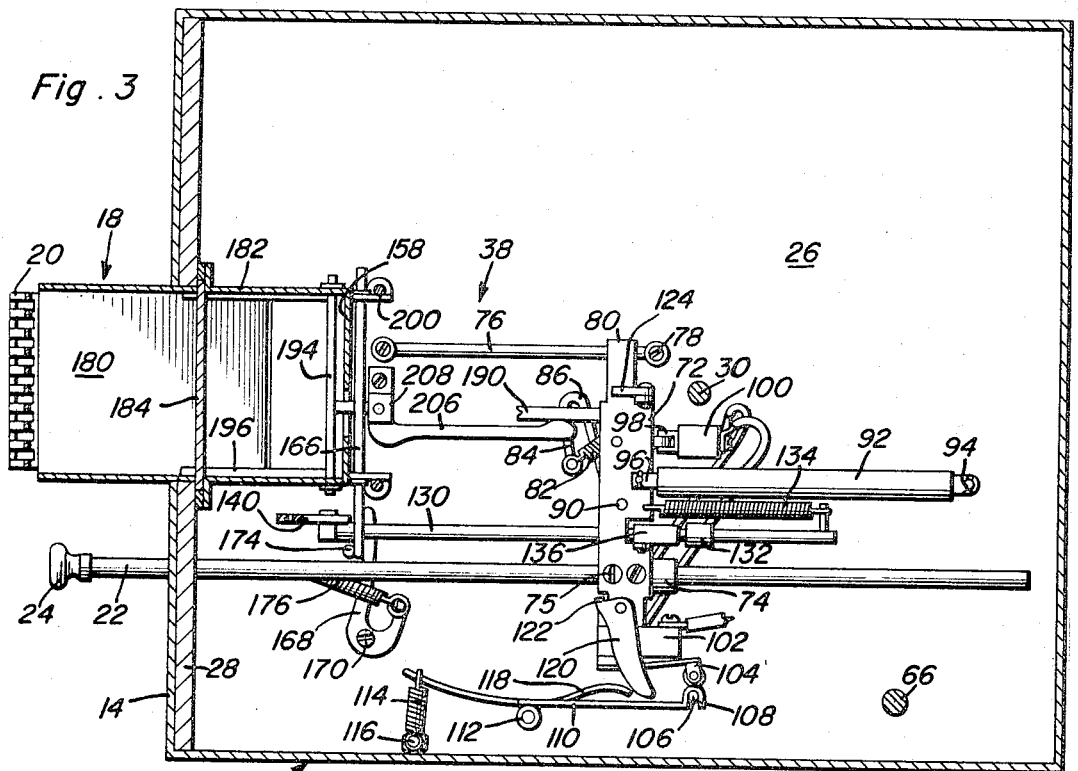
FIGURE 3 is a top sectional view taken substantially through a plane indicated by section line 3—3 in FIGURE 1.

Referring now to the drawings in detail, FIGURES 1, 2 and 3 show the vending machine generally denoted by reference numeral 10. The vending machine includes an outer housing generally referred to by reference numeral 12 having a front panel 14. Mounted on the front panel is a coin control box 16 adapted to receive coins and release the vending machine for operation upon acceptance of the proper amount of coins in a well-known manner. Also mounted on the front panel 14, is a downwardly inclined delivery chute 18 into which articles are to be deposited and removed by upward pivotal opening of the hinged door 20. Also projecting through the front panel 14 on one side of the delivery chute, is an actuating rod 22 to which a pull knob 24 is connected.

Enclosed within the outer housing 12, is a mounting base plate 26 having a front mounting wall 28 formed with an opening through which the delivery chute 18 extends. Secured to the base 26, is a vertical mounting post 30 on which a rotatable cage generally referred to by reference numeral 32 is mounted. The cage 32 supports in circumferentially spaced relation, a plurality of vertically stacked columns of articles 34 as shown by dotted line in FIGURE 2. An indexing drive mechanism generally referred to by reference numeral 36 drivingly engages the cage for indexing movement thereof in order to successively position a column of articles in operative alignment with the delivery chute 18 and an article dispensing mechanism generally referred to by reference numeral 38.

Figure 5:
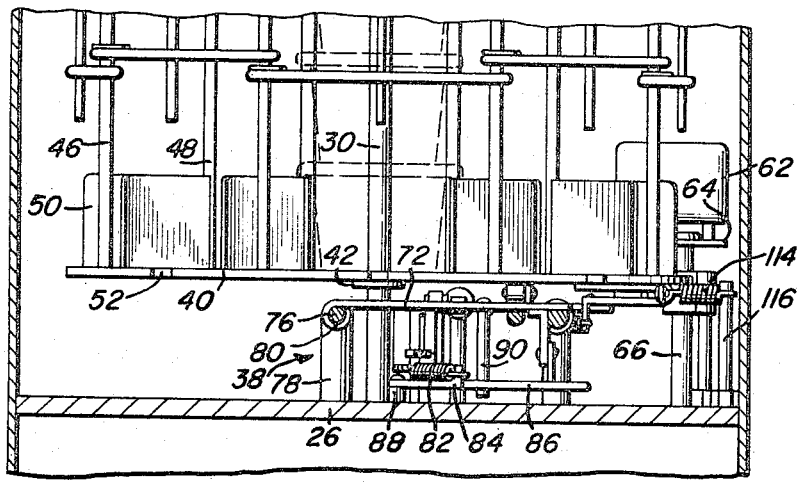
FIGURE 5 is a partial side sectional view taken substantially through a plane indicated by section line 5—5 in FIGURE 1.

Referring now to FIGURES 1, 2 and 5 in particular, it will be observed that the cage 32 includes a bottom conveyor disk member 40 rotatably supported on the mounting post 30 above the thrust washer 42. Vertically spaced above the disk member 40, is a top plate member 44 interconnected with the disk member 40 by means of a plurality of radially outer rods 46. A plurality of radially inner rods 48 also interconnect the disk member 40 and top plate member 44 and form the apices of column divider elements 50. The column divider elements 50 are mounted on the disk 40 and extend upwardly therefrom for a short distance so as to separate the lowermost articles in each of the columns as well as to guide radially outward movement thereof by an ejection mechanism. The disk member 40 therefore also includes a plurality of radial slots 52 which are centrally disposed between adjacent divider elements 50 on either side thereof so that the ejection mechanism may project through each slot 52 when aligned with the delivery chute 18 in order to displace the lowermost article supported on the disk member 40. The articles are loaded onto the cage and retained therein by column gates, each column gate including a pair of vertically spaced arcuate rods 54 and 56 pivotally mounted on one of the radially outer rods 46, the column gate rods 54 and 56 being also interconnected with each other by the connecting rods 58 intermediate the opposite ends thereof. The lower gate rod 54 is also provided with a spring latch 60 engageable with one of the rods 46 so as to yieldably hold the column gate closed in order to retain the stack of articles in the cage.

With continued reference to FIGURES 1, 2 and 5, it will be observed that the indexing mechanism includes a motor gear unit 62 fixedly secured to a mounting plate 64 which is swingable about a vertical axis established through a mounting post 66 secured to the base 26. An output shaft 68 projects downwardly from the gear motor unit 62 through the mounting plate 64 and is connected to a friction drive wheel 70. Spring means (not shown) biases the mounting plate 64 for the gear motor in a counterclockwise direction as viewed in FIGURE 2 so that the friction drive wheel 70 drivingly engages the outer periphery of the cage disk member 40. Accordingly, when the gear motor 62 is energized, rotation of the friction drive wheel 70 will produce rotation of the cage as indicated by the arrows in FIGURE 2. Energization of the gear motor 62 and de-energization thereof is therefore controlled in such a manner as to precisely index the cage as will be hereafter explained in further detail.

Referring now to FIGURES 3 and 5 in particular, it will be observed that the dispensing mechanism 38 includes a laterally extending plate member 72 secured by the fasteners 75 to the selectively operable actuating rod 22 which is guided for sliding movement by the mounting wall 28 and a guide sleeve 74 secured to the base 26. The plate member 72 is also guided for movement with the actuating rod 22 by means of the fixed guide rod 76 secured by the posts 78 on the base. The guide rod 76 is therefore embraced by an end guide portion 80 of the plate member 72. The plate member 72 and the actuating rod 22 connected thereto are biased to a retracted position as shown in FIGURE 3 by means of a return spring 82 one end of which is anchored to the base 26 and the opposite end anchored to an arm 84 of a return lever 86 pivoted on the base 26 by the pivot 88 as shown in FIGURE 5. The return lever 86 is therefore biased by the return spring 82 into engagement with a rod element 90 secured to and projecting downwardly from the plate member 72. It will therefore be apparent that when proper coinage is accepted by the coin box 16, a lock mechanism (not shown) will release the actuating rod 22 so that it may be pulled outwardly by means of the knob 24 against the bias of the return spring 82. When the actuating rod 22 is pulled to the end of its stroke, upon release it is returned to its retracted position by the return spring at a retarded rate of movement. In order to retard the return movement of the actuating rod and the plate member 72 secured thereto, a dashpot device 92 is pivotally mounted at one end 94 to the base while a piston rod 96 extends therefrom and is pivotally connected to the plate member.

In its retracted position, the plate member 72 engages the actuator 98 of a limit switch 100 so as to hold this switch in one of its operative positions. Accordingly, the limit switch 100 is fixedly mounted on the base in proper position for engagement of the actuator 98 by the plate member 72. Also fixedly mounted on the base is another microswitch device 102 having an actuator 104 adapted to be engaged by an actuating rod element 106 depending from the feeler end 108 of lever element 110. The lever element is mounted on the base 26 by the pivot 112 and is biased in a clockwise direction as viewed in FIGURE 3 by means of the spring element 114 anchored to the base 26 by the post 116. Also mounted on the lever element 110, is an actuating arm 118 adapted to be engaged by the pawl element 120 pivotally mounted adjacent one end of the plate member 72. The pawl element 120 as viewed in FIGURE 3, will freely pivot in a counterclockwise direction so that it will not affect displacement of the lever element 110 against the bias of spring 114 when the plate member 72 is being displaced in a leftward direction by the actuating rod 22. However, after the pawl element 120 has passed the actuating arm 118 of the lever element 110, it will again engage the actuating arm during return movement of the plate member tending to pivotally displace the pawl element in a clockwise direction. A stop portion 122 is formed on the pawl element for engagement with the plate member in order to prevent clockwise pivotal movement thereof so that during return movement of the plate member 72, the pawl element will pivotally displace the lever element 110 and thereby release the switch actuator 104 associated with the microswitch device 102. At the time the switch actuator 104 of the switch device 102 is released, the actuator 98 of the limit switch 100 is engaged by the plate member. Accordingly, an energizing circuit is then completed for the indexing motor 62 as shown for example in the circuit diagram of FIGURE 14. It will therefore be apparent, that as the actuator 22 approaches the end of its return movement, the motor 62 is energized in order to initiate indexing movement of the cage. As soon as the cage is moved from its indexed previous position, the feeler end 108 of the lever element 110 is no longer aligned with a slot 52 in the disk member 40 so that the energizing circuit for the motor remains closed until the cage is rotated by an amount sufficient to align the next slot 52 with the feeler end 108 of the lever element 110. The actuator 104 of the microswitch 102 is then engaged once again to de-energize the motor so that it may stop in a precise indexed position.

Pivotally mounted on top of the plate member 72 adjacent to the guide end portion 80, is a pusher element 124. The pusher element is radially aligned with the rotational axis of the cage so that it will project upwardly through the slot 52 in the disk member 40 when the actuator rod 22 is pulled outwardly from its retracted position. A spring element 126 therefore biases the pusher element 124 upwardly into engagement with the bottom of the disk member 40 so that when the plate member underlies the slot 52 therein, the pusher element will project upwardly through the slot as shown in FIGURE 10 in order to engage and push the lowermost article 128 (shown by dotted line in FIGURE 10) radially outwardly. At the same time that the plate member 72 is being displaced by the actuating rod 22, a displacing force is applied to a control rod 130 slidably mounted by the guide sleeves 132 and 133 secured to the base 26. Accordingly, a connecting spring 134 is connected at one end to the plate member 72 and extends rearwardly therefrom for connection to the rear end of the control rod 130. Thus, after the actuating rod 22 has been pulled out by a certain amount, movement will be imparted to the control rod 130. During the return stroke however, the control rod 130 is positively displaced to its rearward position by means of a pawl element 136 pivotally mounted on the plate member 72 and extending rearwardly therefrom for engagement with the notch 138 formed in the control rod for this purpose as more clearly seen in FIGURES 11 and 12.

Connected to the forward end of the control rod 130, is an actuating lever 140 which is pivotally mounted by the pivot bracket 142 on the mounting wall 28. As shown in FIGURES 1 and 11, the upper end of the actuating lever 140 is connected to a downwardly projecting control arm 144 secured to one axial end of a pivot shaft 146 supported by the spaced pivot brackets 148 on the mounting wall 28. A mounting member 150 is connected to the pivot shaft 146 and extends laterally beyond the pivot shaft. Pivotally mounted adjacent opposite ends of the member 150 are article-gripping fingers 152. The article-gripping fingers 152 are mounted by the member 150 about parallel spaced axes which are perpendicular to the horizontal axis extending through the pivot shaft 146. Thus, when the control rod 130 is displaced forwardly by means of the actuating rod 22, it will angularly displace the pivot shaft 146 in a counterclockwise direction as viewed in FIGURE 6 in order to upwardly displace the article grip fingers 152 to a substantially horizontal position as shown in FIGURES 9 and 11. In the horizontal position, the fingers 152 project into the cage so as to embrace therebetween an article 154 above the lowermost article 128 supported on the disk member 40 of the cage. It will therefore become apparent that upward displacement of the fingers 152 is effective to lift the column of articles above the lowermost article 128 so that the lowermost article alone may be displaced by the pusher element 124 from the cage. In the downward retracted positions of the finger elements 152, they are held spaced apart a sufficient distance so as to receive the article 154 therebetween and toward this end, the finger elements 152 are engaged by a pair of vertical cam rods 156. The cam rods are adjustably positioned above the base 26 by the mounting brackets 158 as more clearly seen in FIGURE 4. The cam rods thus engage the fingers 152 on the inside and converge toward each other toward the upper stop ends 160 so that the fingers may be guided into gripping engagement with the article as they are upwardly displaced. Accordingly, the fingers 152 are interconnected by a spring element 162 so as to hold them in engagement with the cam rods 156.

While the column of articles is being supported by the fingers 152 independently of the cage, the lowermost article 128 is pushed by the pusher element 124 onto a weight-responsive, article-depositing element 164 which is pivotally mounted by the pivot shaft 166 between the mounting brackets 158 as more clearly seen in FIGURE 6. Thus, the depositing element 164 in its horizontal position will be aligned with the disk member 40 so as to receive the lowermost article therefrom. The element 164 is normally held in its horizontal position for receiving the lowermost article by means of a lever biasing element 168 pivotally mounted by the pivot 170 on the base. The lever element 168 engages a downwardly depending control arm 172 connected to the pivot shaft 166 to which the element 164 is connected. The lever element is therefore biased to a position engaging the control arm 172 against the stop 174 by means of a spring 176 anchored to the base 26. Therefore, when an article is pushed onto the element 164, the spring 176 will prevent it from downwardly displacing the element 164 about its shaft 166. A latch element 178 engages the lever element 168 at the end of the pullout stroke of the actuating rod 22, the latch element being pivotally mounted and depending from the plate member 72 for this purpose as more clearly seen in FIGURE 13. Accordingly, when the actuating rod 22 is released for return movement, the latch element 178 will temporarily disable the biasing element by displacement thereof against the bias of the spring 176 so that the weight of the article supported on the weight-responsive element 164 will cause it to downwardly pivot about its pivot shaft 166. The article is thereby deposited onto the bottom wall 180 of the delivery chute 18 which projects upwardly into the housing between the internal side supporting walls 182 as shown in FIGURE 6. After the actuating rod 22 has been displaced in a return direction by a predetermined amount, the latch element 178 will release the lever element 168 so that the spring 170 may snap the element 164 back to its horizontal position in preparation for reception of the next article to be dispensed.

Figure 8:
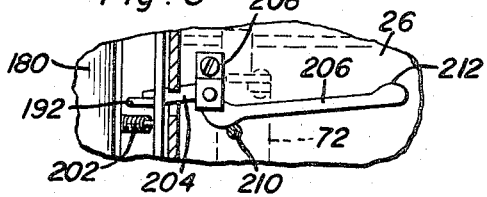
FIGURE 8 is a partial sectional view showing a portion of the mechanism illustrated in FIGURE 7 in another operative position.

Referring now to FIGURES 6, 7 and 8 in particular, it will be observed that the opening in the front panel 14 and the mounting wall 28 through which the delivery chute 18 extends, is closed by a delivery gate 184. The gate 184 is slidably mounted for vertical movement between a closed position and an open position on the mounting wall 28 by means of the vertical guides 186 connected with the side walls 182 to the mounting wall 28. The gate 184 is prevented from being upwardly displaced to an open position until the pivot shaft 146 is angularly displaced by the control rod 130 as aforementioned and toward this end a gate-locking rod 188 is secured to the pivot shaft 146 and projects forwardly therefrom terminating above the upper edge of the gate as more clearly shown in FIGURE 6. Counterclockwise displacement of the pivot shaft 146 will therefore displace the lock rod 188 out of the path of the gate 184 so that it may be upwardly displaced to an open position. The gate 184 is displaced upwardly to its open position however at the end of the pull-out stroke of the actuating rod 22 after the lowermost article from the column stack has been displaced onto the weight-responsive depositing element 164. Accordingly, connected to the plate member 72 and projecting forwardly therefrom, is a gate-actuating projection 190 adapted to engage a gate-control arm 192 secured to a pivot shaft 194 rotatably mounted between the side walls 182. The pivot shaft 194 is secured to a pair of gate-operating arms 196 which extend forwardly therefrom and are received within notches 198 formed along the bottom portion of the gate 184 as more clearly shown in FIGURE 12. The weight of the gate 184 engaging the operating arms 196 holds the gate-control arm 192 in a position as shown in FIGURE 6 projecting through a slot formed in a front wall 200 against the bias of the spring 202. Therefore, when the gate-actuating projection 190 engages the control arm 192, it will upwardly displace the gate 184 to an open position as shown in FIGURE 12 so that the article on the downwardly pivoted element 164, may slide down the delivery chute 18. The gate 184 is then held open until the actuating rod 22 has substantially returned to its retracted position before indexing movement of the cage begins, in order to ensure that the article has passed through the opening to be closed by the gate.

In order to hold the gate open until the actuating rod has returned to its retracted position, the control arm 192 is latched in the open position thereof by means of a latch arm 204 as shown in FIGURE 8, the latch arm being connected to a cam lever 206 pivotally mounted by the pivot bracket 208 on the base 26. The cam lever 206 is pivotally displaced to the position illustrated in FIGURE 8 by means of a latching pin 210 which is secured to and depends downwardly from the plate member 72 so as to cause latching of the control arm 192 in the open position when the actuating rod 22 is withdrawn to the end of its stroke. During the return stroke of the actuating rod and the plate member 72 connected thereto, the cam lever 206 will remain in its latched position to hold the gate open until the actuating projection 190 engages the cam projection 212 at the rear end of the cam lever 206 so as to displace the cam lever to its latch release position as shown in FIGURE 7. The delivery gate 184 may then close and permit complete retraction of the article-gripping fingers 152 to the position shown in FIGURE 6.

From the foregoing description, the construction, operation and utility of the vending machine of the present invention will be apparent. To summarize operation of the machine, it will be recalled that a vending cycle is begun by withdrawing the actuating rod 22 against the bias of the return spring 82. The pusher element 124 on the plate member 72 then enters a slot 52 in the bottom disk member 40 so that continued withdrawal of the actuating rod pushes the lowermost article 128 off the disk member onto the weight-responsive depositing element 164 aligned therewith in a horizontal position. At the same time, movement of the actuating rod is transferred by the spring 134 to the control rod 130 causing upward pivotal displacement of the article-gripping fingers 152 spring-biased into engagement with the vertical cam rods 156. Accordingly, the cam rods guide the gripping fingers into engagement with the article 154 above the lowermost article 128 as shown in FIGURE 9 in order to lift the column of articles by a slight amount and support the column independently of the disk member 40 while the lowermost article 128 is being pushed onto the weight-responsive depositing element 164. Pivotal displacement of the gripping fingers 152 also withdraws the gate-locking rod 188 so as to permit opening of the gate member 184 by engagement of the gate-actuating projection 190 with the gate-control arm 192 as the actuating rod is withdrawn to the end of its stroke. At the same time, the latch element 178 engages the biasing element 168 which holds the depositing element 164 in its horizontal position under the bias of the spring 176. Release of the actuating rod then withdraws the element 168 from engagement with the control arm 172 so that the article will downwardly pivot the depositing element 164 permitting the article to slide downwardly into the delivery chute 18. The article may then be withdrawn from the delivery chute by opening of the door 20. In the meantime, the actuating rod 22 is retracted in a return direction at a slow rate because of the retarding action of the dashpot device 92. The latch element 178 is then released from the lever element 168 so that it may displace the depositing element 164 to its horizontal position in preparation for reception of the next article. During return movement, the gate 184 is held open by the latch arm 204 which had been displaced to a latching position by the latching rod 210 depending from the place member 72. As the plate member approaches the end of its return movement, the gate-actuating projection 190 displaces the cam lever 206 to its latch release position releasing the delivery gate 184 to close the delivery chute. At this time, the plate member 72 engages the actuator of the limit switch 100 while the pawl element 120 displaces the lever element 110 to release the actuator 104 of the microswitch 102. The gear motor 62 is thereby energized to begin indexing movement of the article-supporting cage 32. Once movement begins, the feeler end 108 of the lever element 110 is displaced from a slot 52 so that the microswitch 102 remains released until indexing movement has been completed and the feeler end 108 enters the next slot 52 in the disk member 40. The gear motor 62 is then deenergized so as to hold the cage in a new position with another column of articles aligned with the delivery chute 18.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a vending machine for articles stacked in a plurality of vertical columns, a rotatable support on which said articles are stored, a delivery chute operatively positioned in alignment with one of said columns, selectively actuated ejection means displaceable through a predetermined stroke for displacing a lowermost article radially outwardly of the support into the delivery chute, means responsive to displacement of said ejection means in one direction through said stroke for supporting the column of articles above the lowermost article independently of the support, and indexing means responsive to return movement of the ejection means through said stroke for successively moving said columns into alignment with the delivery chute, said supporting means comprising, a pair of lift fingers, means pivotally mounting the fingers for elevating movement thereof relative to the column of articles, and guide means engageable with said fingers for displacement thereof into gripping engagement with the column during said elevating movement.

2. The combination of claim 1 including article depositing means operatively mounted between the support and the delivery chute for movement by the article from a receiving position to a depositing position, biasing means for holding the depositing means in said receiving position to receive the lowermost article from the support, and means responsive to said return movement of the ejection means for temporarily disabling the biasing means to render the depositing means operative to deposit the article into the delivery chute.

3. The combination of claim 2 including a delivery gate closing said delivery chute, gate control means engageable by the ejection means for opening the delivery gate in response to reception of the lowermost article on the depositing means, latch means engageable with the gate control means for holding the gate open, and cam means engageable by the ejection means for releasing the latch means to close the gate upon completion of said return movement of the ejection means.

4. The combination of claim 1 including a delivery gate closing said delivery chute, gate control means engageable by the ejection means for opening the delivery gate in response to removal of the lowermost article from the support, latch means engageable with the gate control means for holding the gate open, and cam means engageable by the ejection means for releasing the latch means to close the gate upon completion of said return movement of the ejection means.

5. The combination of claim 3 including lock means connected to the lift means for holding the delivery gate closed until the lift means is rendered operative to elevate the column of articles.

6. In a vending machine for articles stacked in a plurality of vertical columns, a rotatable support on which said articles are stored, a delivery chute operatively positioned in alignment with one of said columns, selectively actuated ejection means displaceable through a predetermined stroke for displacing a lowermost article in said one of the columns into the delivery chute, lift means responsive to displacement of said ejection means in one direction through said stroke for elevating and supporting the column of articles above the lowermost article independently of the support, indexing means responsive to return movement of the ejection means through said stroke for successively moving said columns into alignment with the delivery chute, article depositing means operatively mounted between the support and the delivery chute for movement of the article from a receiving position to a depositing position, biasing means for holding the depositing means in said receiving position to receive the lowermost article from the support, means responsive to said return movement of the ejection means for temporarily disabling the biasing means to render the depositing means opertaive to deposit the article into the delivery chute, a delivery gate closing said delivery chute, gate control means engageable by the ejection means for opening the delivery gate in response to reception of the lowermost article on the depositing means, latch means engageable with the gate control means for holding the gate open, and cam means engageable by the ejection maens for releasing the latch means to close the gate upon completion of said return movement of the ejection means, said lift means comprising, a pair of lift fingers, means pivotally mounting the fingers for elevating movement thereof relative to the column of articles aligned with the delivery chute, and guide means engageable with said fingers for displacement thereof into gripping engagement with the column during said elevating movement.

7. The combination of claim 6 including lock means connected to the lift means for holding the delivery gate closed until the lift means is rendered operative to elevate the column of articles.

8. In a vending machine for articles stacked in a plurality of vertical columns, a rotatable support on which said articles are stored, a delivery chute operatively positioned in alignment with one of said columns, selectively actuated ejection means displaceable through a predetermined stroke for displacing a lowermost article in said one of the columns into the delivery chute, lift means responsive to displacement of said ejection means in one direction through said stroke for elevating and supporting the column of articles above the lowermost article independently of the support, indexing means responsive to return movement of the ejection means through said stroke for successively moving said columns into alignment with the delivery chute, a delivery gate closing said delivery chute, gate control means engageable by ejection means for opening the delivery gate in response to removal of the lowermost article from the support, latch means engageable with the gate control means for holding the gate open, cam means engageable by the ejection means for releasing the latch means to close the gate upon completion of said return movement of the ejection means, and lock means connected to the lift means for holding the delivery gate closed until the lift means is rendered operative to elevate the column of articles.

9. The combination of claim 8 wherein said lift means comprises, a pair of lift fingers, means pivotally mounting the fingers for elevating movement thereof relative to the column of articles aligned with the delivery chute, and guide means engageable with said fingers for displacement thereof into gripping engagement with the column during said elevating movement.

10. In a vending machine for articles stacked in a plurality of vertical columns, a rotatable support on which said articles are stored, a delivery chute operatively positioned in alignment wtih one of said columns, selectively actuated ejection means displaceable through a predetermined stroke for displacing a lowermost article in said one of the columns into the delivery chute, lift means responsive to displacement of said ejection means in one direction through said stroke for elevating and supporting the column of articles above the lowermost article independently of the support, and indexing means responsive to return movement of the ejection means through said stroke for successively moving said columns into alignment with the delivery chute, said lift means comprising a pair of lift fingers, means pivotally mounting the fingers for elevating movement thereof relative to the column of articles aligned with the delivery chute, and guide means engageable with said fingers for displacement thereof into gripping engagement wtih the column during said elevating movement.

References Cited

UNITED STATES PATENTS

| | | | |
|---|---|---|---|
| 869,254 | 10/1907 | Munch | 221—248 X |
| 1,050,268 | 1/1913 | Forth | 221—248 |
| 1,184,153 | 5/1916 | Weisner | 221—248 |
| 1,723,497 | 8/1929 | Zucchelli | 221—113 |
| 2,094,765 | 10/1937 | Barnes | 221—16 |
| 2,253,482 | 8/1941 | Forsthoefel et al. | 221—113 |
| 2,435,177 | 1/1948 | Connell et al. | 221—113 |
| 3,169,661 | 2/1965 | Klotz | 221—225 X |

WALTER SOBIN, *Primary Examiner.*